United States Patent
Barton et al.

(10) Patent No.: US 12,278,801 B2
(45) Date of Patent: **\*Apr. 15, 2025**

(54) CENTRAL SCHEDULING FOR ENTERPRISE WIRELESS RANDOMIZING CHANGING/ROTATING MAC ADDRESS

(71) Applicant: Cisco Technology, Inc., San Jose, CA (US)

(72) Inventors: Robert Edgar Barton, Richmond (CA); Jerome Henry, Pittsboro, NC (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/507,349

(22) Filed: Nov. 13, 2023

(65) Prior Publication Data

US 2024/0080297 A1 Mar. 7, 2024

Related U.S. Application Data

(63) Continuation of application No. 17/731,652, filed on Apr. 28, 2022, now Pat. No. 11,902,246.

(51) Int. Cl.
*H04L 61/5076* (2022.01)
*H04L 61/5007* (2022.01)
*H04L 61/5061* (2022.01)

(52) U.S. Cl.
CPC ...... *H04L 61/5076* (2022.05); *H04L 61/5007* (2022.05); *H04L 61/5061* (2022.05)

(58) Field of Classification Search
None
See application file for complete search history.

(56) References Cited

U.S. PATENT DOCUMENTS

| | | | |
|---|---|---|---|
| 2008/0209071 A1* | 8/2008 | Kubota | H04L 9/40 709/238 |
| 2012/0213211 A1 | 8/2012 | Remaker | |

(Continued)

FOREIGN PATENT DOCUMENTS

| | | |
|---|---|---|
| WO | 2020148062 A1 | 7/2020 |
| WO | 2020221465 A1 | 11/2020 |
| WO | 2020229409 A1 | 11/2020 |

OTHER PUBLICATIONS

Andersdotter et al. "IEEE 802.11 Randomized and Changing MAC Addresses Topic Interest Group Report" (Year: 2019).*

(Continued)

*Primary Examiner* — Younes Naji
(74) *Attorney, Agent, or Firm* — Edell, Shapiro & Finnan, LLC

(57) ABSTRACT

A method is provided that is performed for a wireless network that includes one or more wireless client devices that may rotate their media access control (MAC) address used for wireless communication with one or more wireless access point devices in the wireless network. The method includes determining an impact of MAC address rotation by the one or more wireless client devices on operational resources of one or more networking devices or networking processes in a network infrastructure associated with the wireless network. The method further includes scheduling MAC address rotation by the one or more wireless client devices according to the impact on operational resources of the one or more networking devices or networking processes in the network infrastructure.

20 Claims, 7 Drawing Sheets

(56) References Cited

U.S. PATENT DOCUMENTS

| | | | |
|---|---|---|---|
| 2014/0112225 A1 | 4/2014 | Jafarian et al. | |
| 2018/0248795 A1 | 8/2018 | Nainar et al. | |
| 2018/0332534 A1 | 11/2018 | Hou et al. | |
| 2019/0334806 A1 | 10/2019 | Sugatoor et al. | |
| 2019/0349397 A1 | 11/2019 | Li et al. | |
| 2020/0107273 A1 | 4/2020 | Kyou et al. | |
| 2020/0275272 A1* | 8/2020 | Montemurro | H04L 63/0876 |
| 2020/0344203 A1 | 10/2020 | Mermoud et al. | |
| 2020/0351648 A1 | 11/2020 | Fang | |
| 2021/0068172 A1 | 3/2021 | Jeong et al. | |
| 2021/0337460 A1* | 10/2021 | Breaux, III | H04W 8/18 |
| 2021/0367872 A1* | 11/2021 | Huang | H04W 48/16 |

OTHER PUBLICATIONS

5Gnow, "Final MAC/Networking Concepts," Version 1.0, D4.2, Sep. 3, 2015, 72 pages.

Andersdotter, A., et al., "IEEE. 802.11 Randomized and Changing MAC Addresses Topic Interest Group Report", IEEE P802.11 Wireless LANs, doc.: IEEE 802.11-19/1442r9, https://mentor.ieee.org/802.11/dcn/19/11-19-1442-09-0rm-tig-draft-report-outline.odt, Nov. 14, 2019, 13 pages.

Ansley, C., "Status of IEEE 802.11 Randomized and Changing MAC Address Study Group," IEEE, P802.11—Randomized and Changing MAC Address (RCM) Study Group (SG)—Meeting, https://www.ieee802.Org/11/Reports/rcmtig_update.html, updated: Jan. 29, 2021, 2 pages.

Cisco, "Cisco Wireless Controller Configuration Guide, Release 8.10," Cisco, https://www.cisco.com/c/en/us/td/docs/wireless/controller/8-10/config-guide/b_cg810/wlan_security.html, updated: Dec. 11, 2021, 111 pages.

Cisco, "Configuring DHCP Snooping, IP Source Guard, and IPSG for Static Hosts," Software Configuration Guide—Release 12.2(53)SG, Chapter 45, May 2020, 30 pages.

Finstad, R., "Implementation of Network Moving Target Defense in Embedded Systems," Master of Science, Jan. 2020, https://dr.lib.iastate.edu/entities/publication/06a5b8d3-1414-4fa4-b64a-dea364ea2236, 43 pages.

Android Open Source Project, "MAC Randomization Behavior," https://source.android.com/devices/tech/connect/wifi-mac-randomization-behavior, Mar. 18, 2022, 4 pages.

Nurchis, M., et al., "Target Wake Time: Scheduled access in IEEE 802.11ax WLANs," IEEE Wireless Communications, Apr. 20, 2018, 14 pages.

Petit J., et al., "Pseudonym Schemes in Vehicular Networks: A Survey," ResearchGate, IEEE Communications Surveys & Tutorials, https://www.researchgate.net/publication/264773172, Mar. 2015, 33 pages.

Vidurbatra80211, "802.11ax—Target Wake Time (TWT)," 802.11 from my eyes, Wordpress, https://vidurbatra80211.wordpress.com/2019/05/30/802-11ax-target-wake-time-twt/, May 30, 2019, 5 pages.

\* cited by examiner

CENTRAL SCHEDULING FOR ENTERPRISE WIRELESS RANDOMIZING CHANGING/ROTATING MAC ADDRESS

CROSS REFERENCE TO RELATED APPLICATION

This application is a continuation of U.S. application Ser. No. 17/731,652, filed Apr. 28, 2022, the entirety of which is incorporated herein by reference.

TECHNICAL FIELD

The present disclosure relates to wireless networking.

BACKGROUND

Randomized Changing/Rotating Media Access Control (MAC) (RCM) addresses is a feature of wireless networks, such as wireless local area networks (WLANs), whereby wireless clients or stations (STAs) rotate their MAC address at pseudo-random intervals. The current RCM mechanisms are generally stochastic—meaning STAs rotate according to their own schedule, without any concept of centralized coordination. As a result, multiple STAs with similar wireless drivers may coincidentally rotate the same way at approximatively the same time.

For example, consider the case of students entering a university classroom, all with similar laptops or mobile handset devices, many of which use similar wireless drivers. The devices may be set to rotate their MAC addresses at the first opportunity after a predetermined period of time of activity. The first opportunity in this system is understood as idle time for 30 seconds or more, or disconnection. In this case the students are actively taking notes in class, then all leaving the class at the same time. All of them would rotate their MAC at the same time, upon leaving the class, causing unnecessary load and stress on the network, and backend services (DHCP, etc.). At the scale of the campus, when classes end, as many as tens of thousands of STAs simultaneously rotate their MAC address, causing a heavy strain on the network infrastructure devices and processes, such as access points (APs), network controllers, Dynamic Host Configuration Protocol (DHCP) severs, Authentication, Authorization and Accounting (AAA) servers, etc.

Similar scenarios not only cause a flood of de-association/re-association messages to the wireless infrastructure at the same time, but also cause a burden on the DHCP server resources, as well as Layer 2 control plane resources, such as Address Resolution Protocol (ARP) and MAC address learning, causing processors in the network devices to spike at regular intervals across all network devices associated with the wireless network.

DESCRIPTION OF EXAMPLE EMBODIMENTS

Overview

In one embodiment, a method is provided that is performed for a wireless network that includes one or more wireless client devices that may rotate their media access control (MAC) address used for wireless communication with one or more wireless access point devices in the wireless network. The method includes determining an impact of MAC address rotation by the one or more wireless client devices on operational resources of one or more networking devices or networking processes in a network infrastructure associated with the wireless network. The method further includes scheduling MAC address rotation by the one or more wireless client devices according to the impact on operational resources of the one or more networking devices or networking processes in the network infrastructure.

Example Embodiments

Presented herein are techniques for a centralized scheduling method for rotating MAC addresses of wireless client devices when the infrastructure suggests wireless client devices to rotate their MAC addresses. This is done to preserve resources and performance of access points (APs) and other networking devices, and more specifically to mitigate and coordinate large-scale MAC rotations in a smooth manner that can minimize the impact on networking devices and services.

All wireless client devices in a certain locale may be prevented from rotating at the same time so that APs and other networking resources are preserved. For example, a crowd enters a conference center at around 8 AM, as the doors open, and many wireless clients thus associate (some a bit earlier from the outside, some from the inside) within a short (e.g. 30 minute) window. In a college campus environment, class starts at 8 AM, and many students enter a building between, say, 7:40 and 7:50. Some may come earlier, some later, this point is not important. What is important, however, is the timer of the MAC address rotation algorithm. In the case of an 8 hour DHCP lease, after 4 hours, these wireless clients of a first type are ready to rotate their MAC addresses. A particular operating system or a particular Wi-Fi driver running in a client may be set to trigger MAC address rotation at a first disconnection after the first half of the DHCP lease, which means in this context, at first opportunity 4 hours after initial association. For most students (clients), this threshold is reached between 11:40 and 11:50. The exact time at which the trigger happens on each client is not very important, because all the students are seated in a class at that time, their devices are associated to the class AP(s), and thus no MAC address rotation can happen. However, at the end of the class (which happens for all students in the auditorium at the same time), all students stand up and leave the auditorium to go to their next class. As they do so (and disconnect from their current individual AP), their wireless clients all rotate their MAC addresses.

Figure 1:
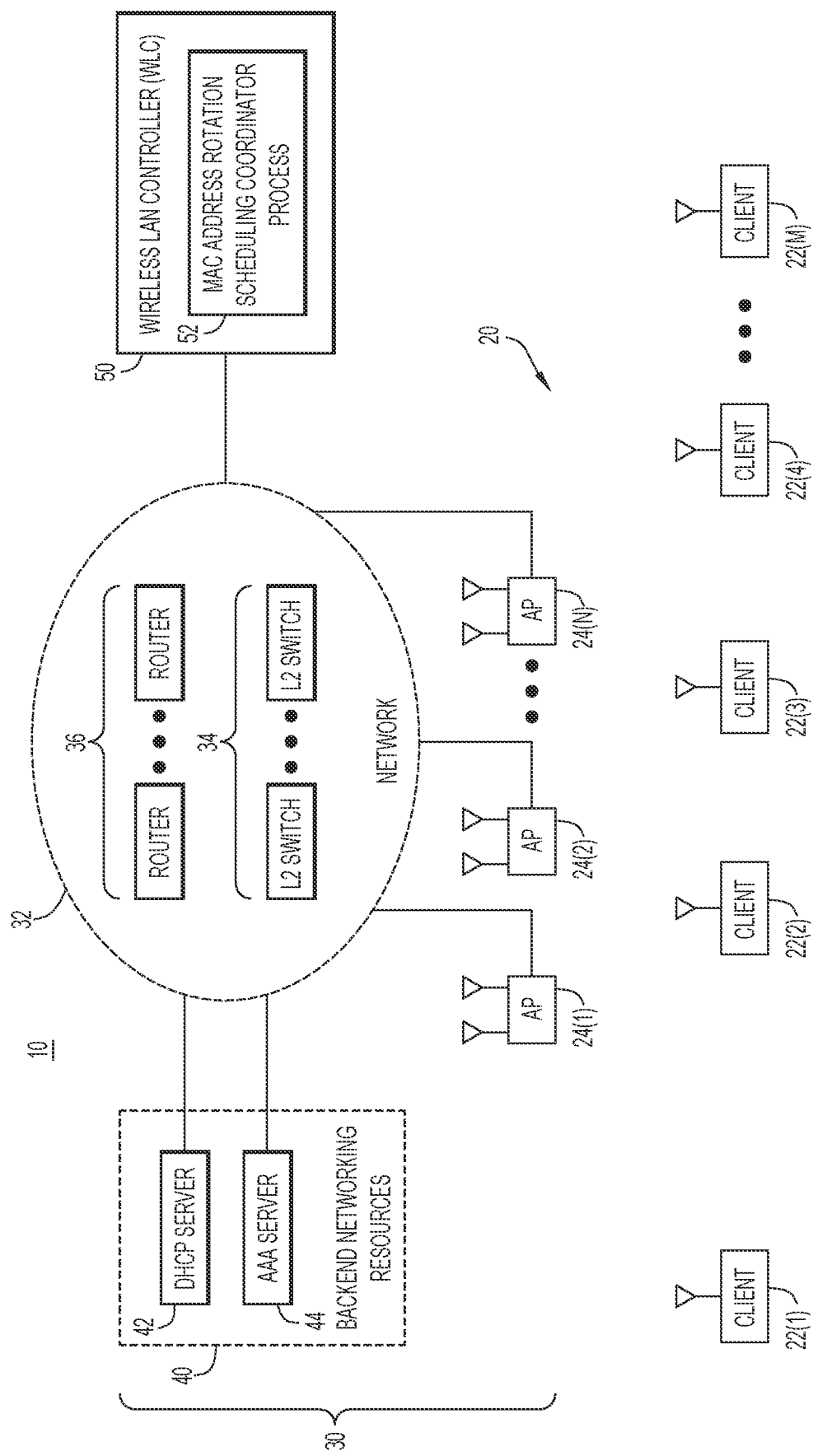
FIG. 1 is a block diagram of a networking environment in which techniques are provided to manage the scheduling of rotations by one or more wireless client devices of media access control (MAC) addresses, according to an example embodiment.

Reference is first made to FIG. 1. FIG. 1 shows a networking environment 10 that includes a wireless network 20. The wireless local area network (WLAN) 20 includes wireless client devices 22(1)-22(M) (also called "clients" or "stations" (STAs)) that wirelessly communicate via any of one or more wireless APs 24(1)-24(N). There is a network infrastructure 30 that enables network communication for the wireless client devices 22(1)-22(M). The network infrastructure 30 includes the APs 24(1)-24(N), along with various networking devices and processes operating in a wired local and/or wide area network 32. The networking devices and processes in network 32 may include one or more layer 2 (L2) switches 34, one or more routers 36, as well as other devices or processes, such as gateways, firewalls, etc. For the sake of simplicity, switches 34 and routers 36 are shown in network 32, but this is not meant to be limiting. The network infrastructure 30 may further include backend networking resources 40, such as a Dynamic Host Configuration Protocol (DHCP) server 42 and an Authentication, Authorization and Account (AAA) server 44.

A WLAN controller (WLC) 50 is provided that may be configured to perform one or more various control and management functions for the WLAN 20. In addition, the WLC 50 may be configured to execute a MAC address rotation scheduling coordinator process ("Scheduling Coordinator") 52, which is described in detail below. The Scheduling Coordinator 52 could operate as an Application Programming Interface (API) accessible service in association with the WLC 50 or it may be a function running on another network management controller or entity.

Figure 2:
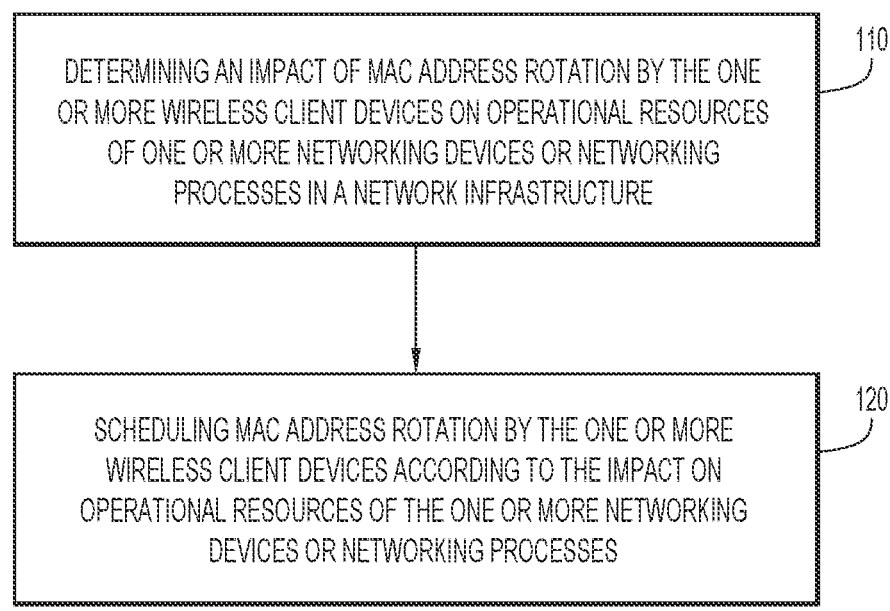
FIG. 2 is a flow chart depicting, at a high-level, a method for managing the scheduling of MAC address rotations by wireless client devices, according to an example embodiment.

Reference is now made to FIG. 2, which illustrates a flow chart depicting the operations of the WLC 50 in performing the MAC address rotation scheduling coordinator process 52, according to an example embodiment. The flow chart of FIG. 2 depicts at a high-level, a method 100 performed for a wireless network that includes one or more wireless client devices that may rotate their media access control (MAC) address used for wireless communication with one or more wireless access point devices in the wireless network. The method 100 may be performed by the Scheduling Coordinator 52 (e.g., a software process running on the WLC 50). The method 100 includes, at step 110, determining an impact of MAC address rotation by the one or more wireless client devices on operational resources of one or more networking devices or networking processes in a network infrastructure associated with the wireless network. Several examples of mechanisms by which this impact is determined are described below with reference to FIGS. 3 and 4. At step 120, the method 100 includes scheduling MAC address rotation by the one or more wireless client devices according to the impact on operational resources of the one or more networking devices or networking processes in the network infrastructure. Examples of various mechanisms by which this scheduling operation may be performed are described below.

In one example, in a college campus environment, a DHCP lease could last several days (e.g., 8 days). A half lease for a student connecting first on Monday morning is therefore Friday morning). When the lunch bell rings on Friday at noon, a larger number of students, having spent their week on campus, converge from nearby buildings to the cafeteria building. The network sees a massive amount of connections that appear to be new (as many STAs have rotated their MAC address at the same time, as they obey the same algorithm). The same can happen when moving between classes. There are 3 main wireless client operating system (OS) vendors, and as a result three main MAC rotation algorithms. While not a problem for an individual wireless client, this pseudo-random yet predictable behavior becomes a problem when a large amount of alike wireless clients make the same decision, the same way, and therefore at the same time.

One goal of the techniques presented herein is to limit the effect of simultaneous MAC address rotations on the infrastructure resources. Thus even if a portion of the wireless clients (⅓, ¼) follow a request from the Scheduling Coordinator 52, it is much less strain on the network resources. The Scheduling Coordinator 52 can learn the MAC address rotation patterns, and initiate a partial de-coordination of the MAC address rotations to limit the impact on the network resources. For example, if 400 wireless clients are expected to rotate all together at 11 AM when a class bell rings and 1500 students leave the auditorium. The MAC rotation scheduling techniques presented herein allow to start rotating by batches of, say, 50 wireless clients, a few minutes before the class end time, and then the remaining batches are allowed to rotate over several minutes instead of having to manage 400 quasi-simultaneous requests.

Figure 3:
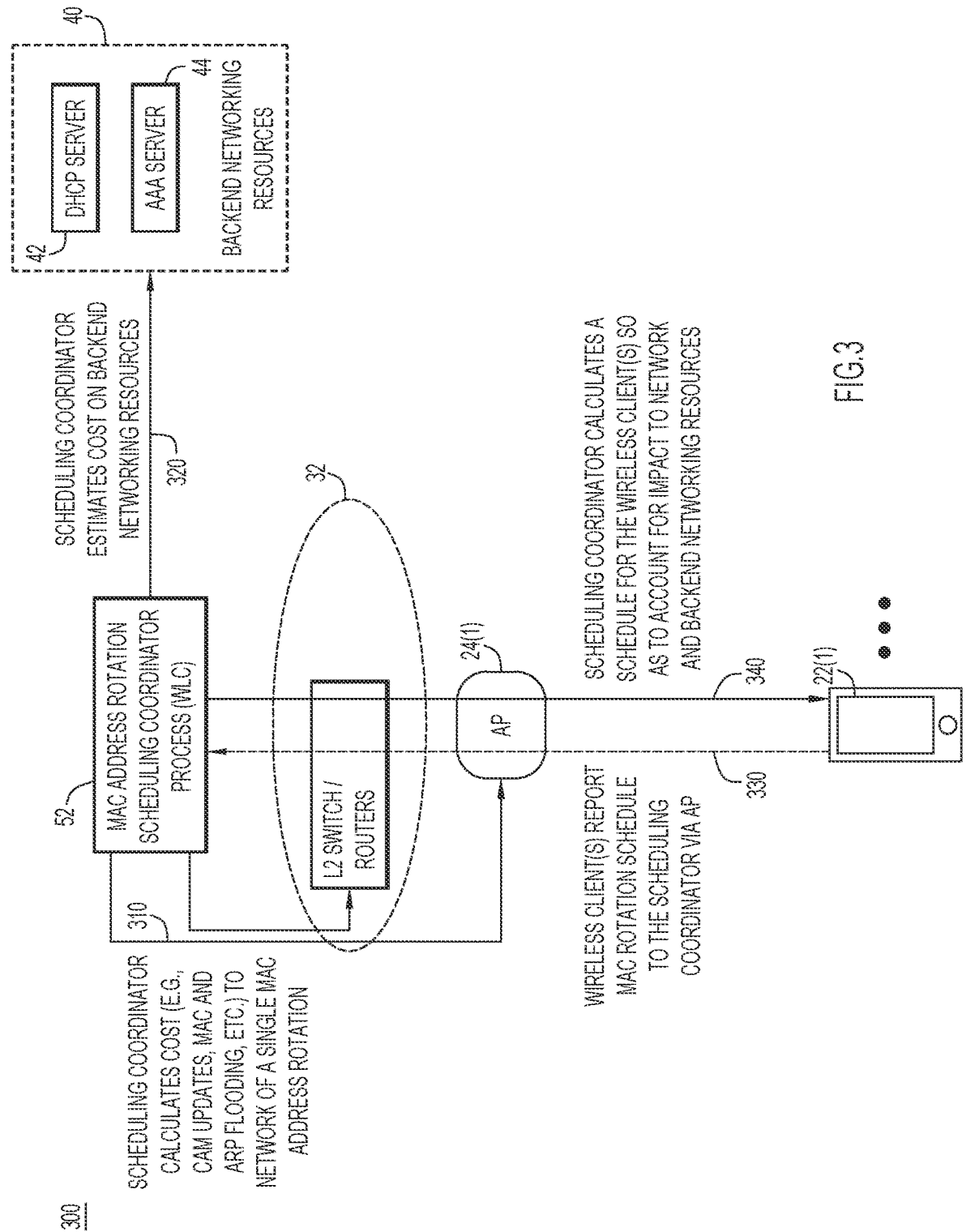
FIG. 3 is a simplified diagram showing portions of the networking environment of FIG. 1, and illustrating in more detail, the operations performed to manage scheduling of MAC address rotations by wireless client devices, according to an example embodiment.

Reference is now made to FIG. 3. FIG. 3 illustrates a process 300 by which the Scheduling Coordinator 52 manages the schedule for MAC address rotation by one or more wireless clients in a wireless network. At step 310 of process 300, the Scheduling Coordinator 52 determines for each element of the managed network, a MAC-rotation-cost. This cost represents the effect on the network device/entities of a MAC address rotation event by a wireless client. For example, one MAC address rotation by a wireless client may impose a cost (computation burden) on a L2 switch in terms of an update event for a Content Addressable Memory (CAM) of the switch, as well as MAC address flooding and learning. As another example, one MAC address rotation by a wireless client may impose a cost on a router in terms of an Address Resolution Protocol (ARP) update event (as well as a broadcast event). As still another example, one MAC address rotation by a wireless client may impose a cost on an AP and/or WLC in terms of a full IEEE 802.1X and Pairwise Master Key (PMK) generation event. These costs are just non-limiting examples of the burden imposed on networking devices and processes in network 32 as a result of a MAC address rotation by a wireless client. Arguably, if only one wireless client performs a MAC rotation, this may not be as burdensome, but if hundreds or even thousands of wireless clients do a MAC rotation within a short window, this may severely impair the entire network for a small, but noticeable period of time.

Cost may be represented as a relative value, and is generally influenced by how long it takes to perform MAC address rotations for a wireless device. For example, if only a single MAC address (for a single wireless device) rotates, the impact to the time it takes is negligible. However, if thousands of MAC addresses are rotated at substantially the same time, the time it takes for all wireless clients to rotate their MAC addresses and resume operation in the network increases significantly due to load on the network devices/entities that need to perform one or more operations based on the change in a MAC address. The cost could be measured/represented as values between 1 and 100, where 1 is the cost represented by the time it takes a single wireless client to rotate MAC (or just to on-board) and 100 is the cost where wireless clients have to wait several minutes. In the middle somewhere is a threshold where wireless clients will notice the lag time and will start to "complain", such as 5 seconds, with a cost of 50. Thus, the intent may be to keep the total cost to less than 50 at all times (less than 5 seconds MAC rotation/on-boarding time) for all clients. The Scheduling Coordinator 52 may take actions to keep the total cost to less than some value (e.g., 50) by smoothing out the rotation schedule instead of doing "lumpy" rotations that cause the cost to go above 50.

The time cost is related to the computing cost. IEEE 802.1X authentication involves a several packet exchange with a RADIUS server. For each client, the RADIUS server needs to compute (determine the validity of) the authentication, then fetch a policy, compute keying material, then return all this to the WLC 50. This computation has a cost (in terms of CPU consumption etc.). Each RADIUS server is tailored to handle a certain number of simultaneous transactions (just like a web server). Consequently, for example, if a RADIUS server is expected to handle up to 20 simultaneous authentication queries (and each lasts 2 seconds on average), then all the server sockets, and all its allocated resources, can be consumed when that threshold is reached. Thus, for the 802.1X authentication process, the Scheduling Coordinator 52 can compute the cost based on the expected number of requests, factored by an acceptable delay time. Saturating to 100% may be acceptable, if all transactions complete and the next client wait time is small (e.g., above, 2 seconds), but if the wait time increases, then the user satisfaction decreases, clients start timing out and giving up, etc.

In a CAM MAC address learning, for example, the time window is smaller, because writing a new MAC address in a table does not take long (milliseconds scale). However, the number of MAC addresses that a CAM contains is limited. Thus, what may occur is that the new MAC address is learned, but the CAM table is full, thus causing the oldest entry to be dropped (to make space for the new entry). If that oldest entry is a valid/existing client, then that client suddenly does not exist anymore in the network device. When a frame comes in for that MAC address, the network device has to query (flood) all its interfaces in search for the location of that client. This causes delay, additional traffic on all links (and the risk that the client may be a Wi-Fi STA in a down state, that does not get the request, thus causing additional delay in frame delivery, additional requests etc.). Therefore, the cost can be an arbitrary scale reflecting the loss of efficiency, and time wasted, caused by the sudden increase of MAC addresses to process into the CAM. The cost value of 100 could be a worst case/cost scenario where all MAC addresses need to be relearned, causing massive floods and delays on the network (probably not at the scale of minutes, but likely tens of seconds). Along with these delays, normal frames are dropped and lost (thus the matching data will have to be retransmitted).

The case of ARP is similar to that of the CAM table, where an IP address may be matched against 2 MAC addresses (the old one and the new) and the routers do not know which one is correct, causing queries to be sent around, with the same risks as in the situation of the CAM.

Thus, the Scheduling Coordinator can be fed with the individual costs of each process. In the crudest case, this is manually configured by an administrator that looks at the RADIUS server specifications, number of CAM entries in the switch etc., and then determines that a cost of 100 is reached on the RADIUS server when 50 requests arrive within a second (because 20 simultaneous requests is the supported load, each takes 2 seconds, and more than a 5 seconds wait is the threshold that hurts the user experience). There may be similar logic on a network switch. Based on the CAM size, e.g. 500, with an individual lifetime of 5 minutes, thus 100 new entries within a minute cause a cost of 100 entries to be relearned, with a time cost of e.g. 15 seconds and additional network load of, for example, 20%, and this is cost level of 100.

The Scheduling Coordinator can then compute a hybrid metric (cost) that combines all these costs together (brings them to the same scale and adds them).

In a more advanced mode, a baseline of activity is established (mean load per time interval for each device, RADIUS server, switch, etc.) by a management tool. The increase of percentage of load caused by MAC address rotation is computed as the cost (e.g. 100% increase being a cost of 100).

Similarly, at 320, the Scheduling Coordinator 52 estimates the cost on backend networking resources 40 for a MAC rotation event. For example, the Scheduling Coordinator estimates the cost imposed on the DHCP server 42 a full DHCP address allocation event. This is cost in terms of load on the DHCP server 42. If the DHCP server 42 needs to provide thousands of Internet Protocol (IP) addresses all at once, this will increase load, and will take time to readdress all the individual clients. Load can be relative, but generally may be measured with an Application Performance Management (APM) tool.

The DHCP server 42 has similar limitations as the CAM, in that it contains a limited number of possible entries. If overloaded, suddenly the DHCP server runs out of addresses, and new clients cannot get a new IP address. This is the highest cost (in an arbitrary metric, this could be 100). Below that threshold, the DHCP server 42 has the same constraints as the RADIUS server. The DHCP server 42 can take a number of simultaneous requests, anything beyond that number uses all possible sockets/slots, and the client has to wait to get an IP address. As the client does not get a response (on time), it resends the request, tries to get a response from another DCHP server (that may not exist), then self-allocates an IP address (using Automatic Private IP Addressing (APIPA) techniques), which does not allow for any real communication, but does cause real user frustration (cost of 100 as well, as the effect is the same, 'no IP address'. The difference is that the user may attempt to manually retry at any time, if they know what the issue is. Application management tools can measure how many of the 'n' concurrent slots/sockets are used on average, how many of the pool addresses are allocated on average, and thus measure a deviation from the mean toward overload. This could replace the manual admin configuration for the cost of 100, as in the previous case.

In steps 310 and 320, the Scheduling Coordinator associates a resource cost with each networking device/networking process. The resource cost represents a limit of the networking device/networking process, such as the number of MAC rotation events per time interval that the networking device/networking process is able to support. In other words, the cost is how much impact the MAC address rotation would have if done all at once. The more wireless clients that rotate their MAC addresses at substantially the same time (within some time interval/window), the higher load cost that is imposed on the networking devices/services. Again, the intent is to smooth this out so that the load/cost does not exceed some amount.

This may be defined by the vendor of the networking device/networking process, and may be configurable, such as the number of DHCP packets per second that a switch interface can receive and relay, as described in https://www.cisco.com/c/en/us/td/docs/switches/lan/catalyst4500/12-2/53SG/configuration/config/dhcp.html.

Wireless clients associate to an AP and will be using MAC address rotation. For example, wireless client 22(1) associates to AP 24(1). In one embodiment, at 330, the wireless client 22(1) communicates its MAC address rotation interval schedule with the AP 24(1). The AP 24(1) in turn communicates this schedule to the Scheduling Coordinator 52. In another embodiment, the wireless client 22(1) does not communicate its MAC address rotation schedule, and instead, the infrastructure (AP and/or WLC) determines the MAC address rotation type for a given wireless client (using passive scanning and correlation) associated with traffic of a wireless client. This may involve monitoring the content of IEEE 802.11 Information Elements, employing a user agent in web browser client and other applications and techniques.

The AP 24(1) reports MAC address rotation interval or schedule to the Scheduling Coordinator 52 for central analysis and processing.

Figure 4:
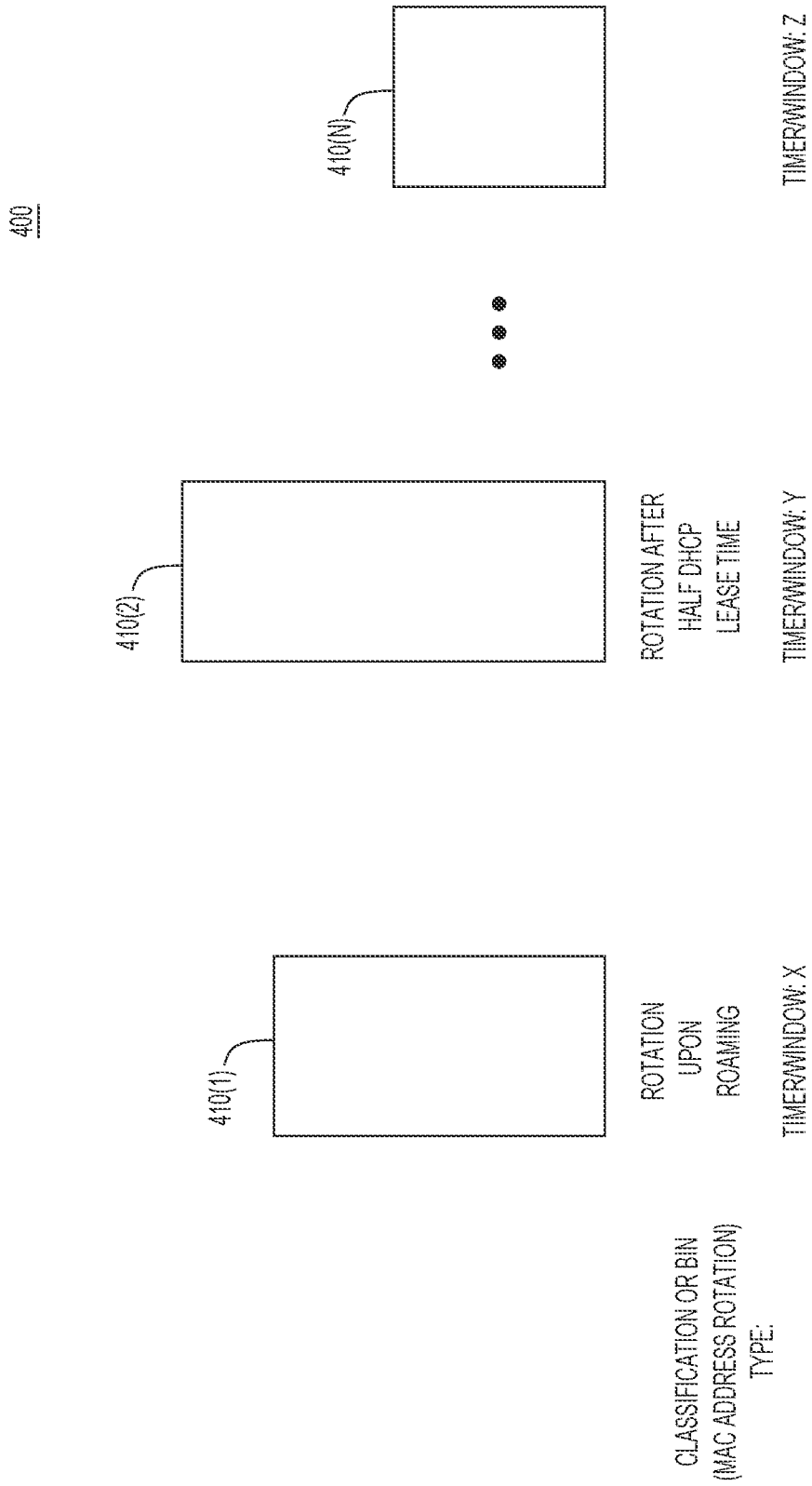
FIG. 4 is a diagram depicting a representation of bins of classifications to which wireless clients may be assigned based on their MAC address rotation behavior type, according to an example embodiment.

The Scheduling Coordinator 52 assigns each MAC address rotating wireless client to a classification or bin that matches or is an appropriate fit to the MAC address rotation behavior type, along with the associated rotation timer/window. In other words, each bin has an associated rotation timer/window. For example, the MAC address rotation behavior types may include: rotation upon roaming, rotation after half DHCP lease time, etc. A graphical representation 400 of these MAC address rotation behavior type bins is shown in FIG. 4, where a first bin 410(1) is associated with wireless clients of a first MAC address rotation behavior type (e.g., rotation upon roaming) and a timer/window "X", a second bin 410(2) is associated with wireless clients of a first MAC address rotation behavior type (e.g., rotation after half DHCP lease time) and a timer/window: Y, and so on for up to bin 410(N) having an associated timer/window Z.

The rotation timer/window may be a specified time interval, or may be learned. For example, all wireless clients on APs 1-6 in a lecture hall do 90+% rotations at 10 AM, 12 PM and 2 PM on weekdays. In another embodiment, the Scheduling Coordinator 52 can also learn patterns of MAC address rotations for certain physical spaces. For example, in a classroom setting where students arrive at approximately the same time, the Scheduling Coordinator can learn the MAC address rotation schedule because it may be quite predictable.

Based on the aggregate or combined MAC address rotation cost curve for all associated wireless clients (when the peaks of MAC rotation will be, etc.), at step 340, the Scheduling Coordinator 52 computes a schedule for the wireless clients to perform MAC address rotation in a manner to account for the impact to the networking devices in network 32 and the backend networking resources 40.

In one example, the Scheduling Coordinator 52 uses the bin (and timer) count to establish a projected stress level on each networking device/process. This may be done with machine learning techniques. Each networking device/process will behave differently in different networks, depending on the configuration, type of device/process, etc. However, by collecting this information and modelling it, the stress levels may be projected using the observed network parameters. This can also be adjusted over time as more data is observed. This allows the Scheduling Coordinator 52 to establish a projected stress level on each networking device/process from the bin (and timer) count.

As the projected stress level reaches a configurable threshold, the Scheduling Coordinator creates a rotation schedule for a new wireless client, placing its rotation time during a time slot/time interval according to (e.g., that minimizes) overall network and backend resource impact. As more and more wireless clients associate with MAC rotation capabilities, the Scheduling Coordinator 52 may smooth out the overall MAC rotation periods of the clients in a way that minimizes overall impact to the network resources.

Figure 5A:
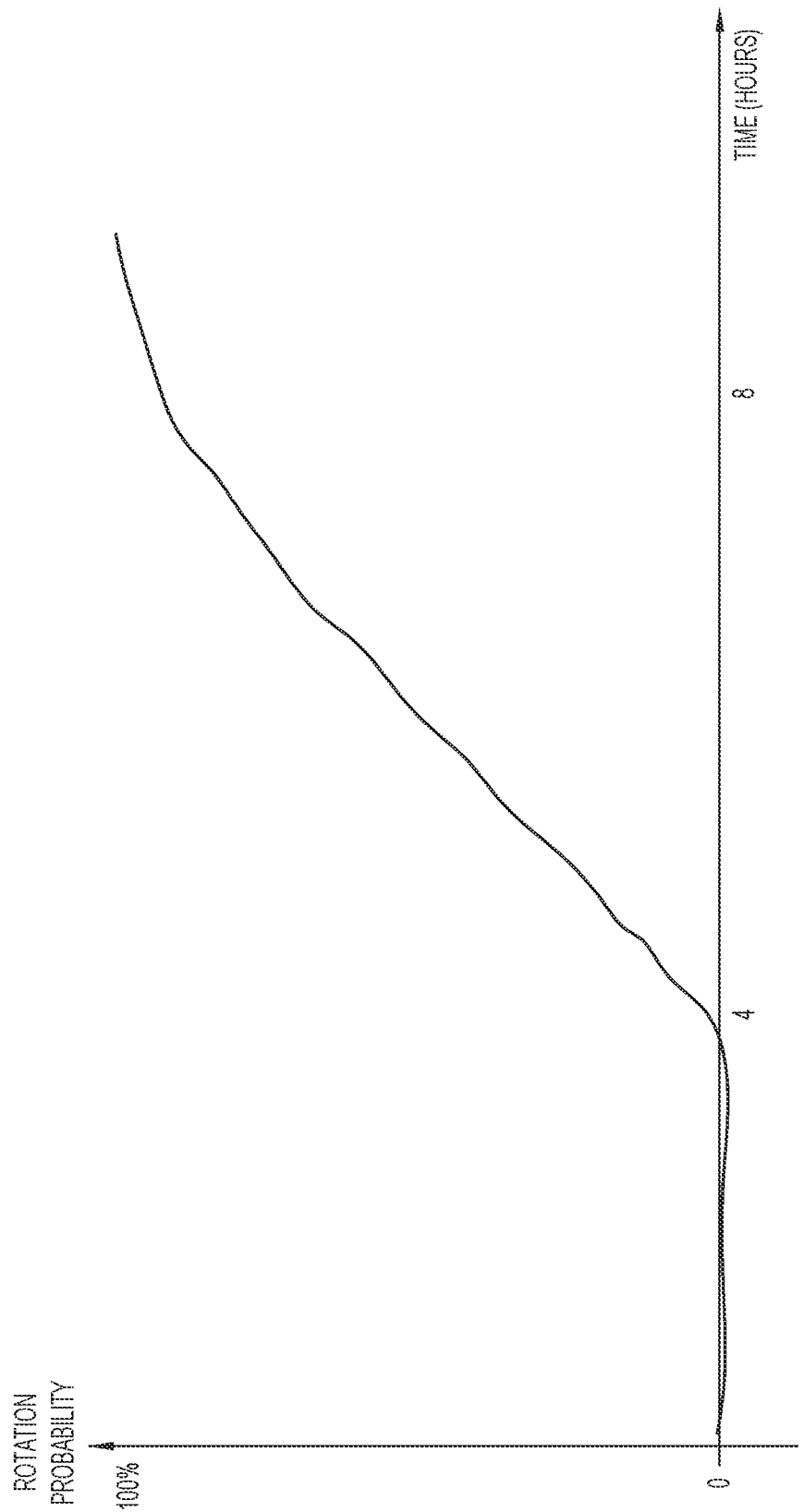
FIGS. 5A and 5B are plots illustrating examples of rotation probability over time that may be used to predict the cost on the networking infrastructure for MAC address rotations by clients, according to an example embodiment.
Figure 5B:
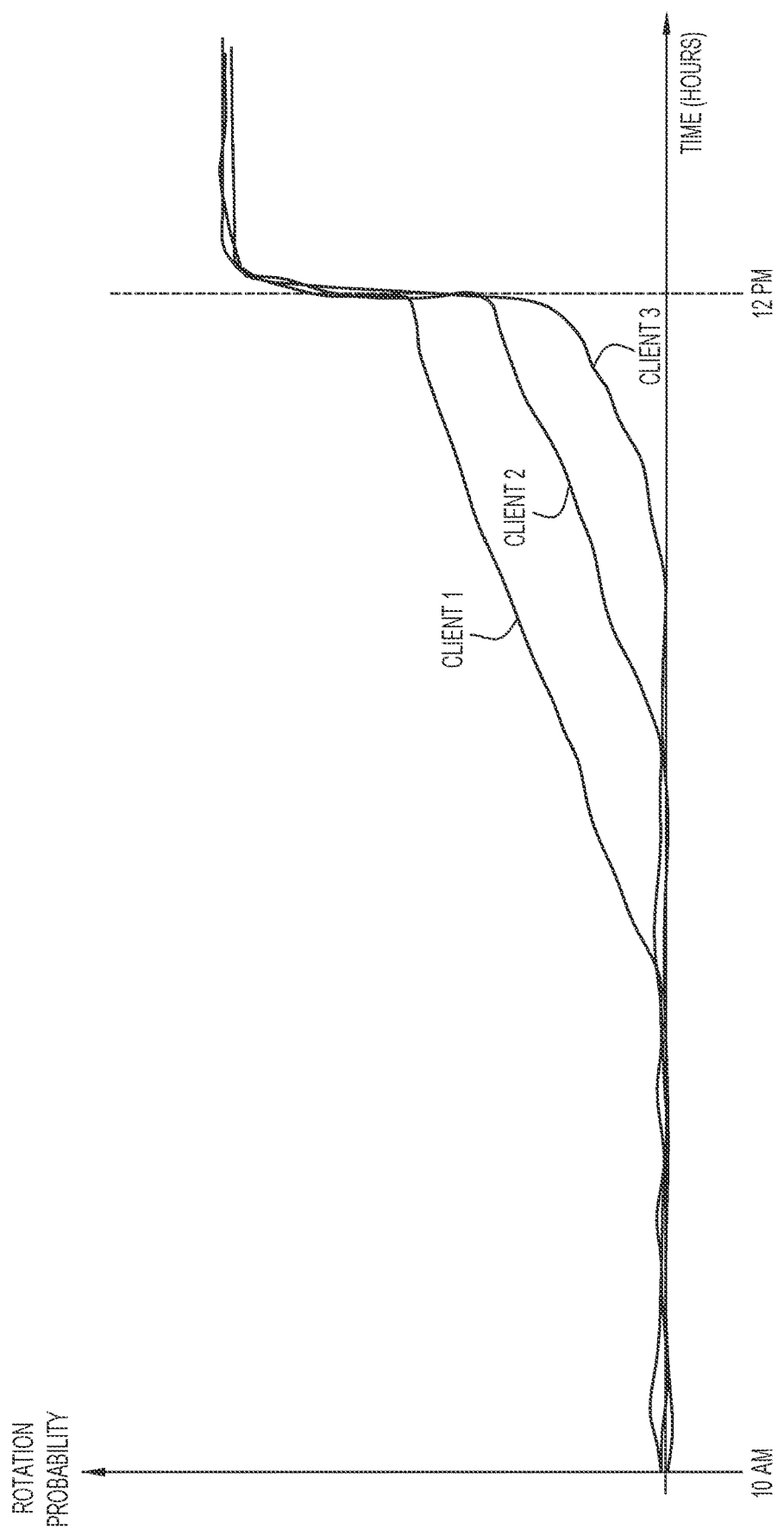

The foregoing discussion of the operations of the Scheduling Coordinator can be useful if considered as a cumulative graph. Reference is also made to FIGS. 5A and 5B. Each client is characterized, and then its rotation probability is established. For example, a client rotates its MAC address after half the DHCP lease, where the lease is 8 hours. As shown in FIG. 5A, at t=4 hours, the probability goes from close to 0 to a linear increase, reaching 100% at the end of the lease. This is because the client may move at any time between t=4 and t=8, and the likelihood to move is higher as time progresses.

Reference is now made to FIG. 5B. Applying this to the lecture hall example described above, the number of clients that reach the t=4 threshold between 10 AM and 12 PM are counted. The other bins are also counted, for example, those where rotation is every 30 minutes after an idle time etc.; the same type count is applied to each bin. For example, 96% of them will rotate at 12 PM, if they reach the t=4 threshold (when the probability becomes linear) between 10 AM and 12 PM. The probability of n MAC address rotations happening in, for example, the 12:00 to 12:01 interval associated to that classroom (and associated impact on the AP, DHCP server, switches etc.) is shown for 3 clients (Client 1, Client 2 and Client 3) as an example in FIG. 5B.

By combining these bins (in the bin above, for example 360 clients have reached t=4 in the 10 AM-12 PM window and 96% of them are expected to rotate in the 12:00 to 12:01 window. Another bin may be assigned clients reaching some hybrid threshold (e.g. idle time on the client that depends on what the user is doing), thus the Scheduling Coordinator 52 can compute that 43% of 200 clients in that bin are likely to also rotate between 12:00 and 12:01.

With all these bins, and each time window (here 12:00 to 12:01 being of most interest), the Scheduling Coordinator 52 projects a stress level to each network element associated with that lecture hall. This can be done with machine learning. For example, 432 clients are likely to rotate between 12:00 and 12:01, but the RADIUS server can serve only 20 queries at any given time, and each query takes 5 seconds to complete. The means 240 requests are possible over that one-minute interval, way less than 432, so the RADIUS server is in high stress. Meanwhile, the DHCP server may be able to serve 20 requests at any given time, and each address takes 2 seconds to be processed (reserved allocated, confirmed etc.). That is, 600 transactions are possible over that one-minute interval for the DHCP server. The stress may be computed as 432/600=72%. The metric of each networking device or process is combined with the metric of each of the other networking device or process, to obtain an overall stress score. In this example, the 100% stress on the RADIUS server makes that the stress of the overall network infrastructure 100% (the highest score wins/dominates).

Thus, the MAC address scheduling techniques presented herein involve adjusting a timing of MAC address rotations performed by a plurality of wireless client devices to smooth out processing burden on the one or more networking devices or networking processes. The step of adjusting may involve limiting a number of MAC address rotations by the plurality of wireless client devices within a predetermined period of time (time interval).

FIGS. 5A and 5B depict examples of operations performed in determining an impact of MAC address rotation by the one or more wireless client devices on operational resources of one or more networking devices or networking processes, employing the concepts of bits or classifications of FIG. 4. In particular, these figures illustrate how impact of MAC address rotation by one or more wireless client devices may be determined by assigning each of the one or more wireless client devices to a classification (i.e., a bin) based on a MAC address rotation behavior type of the one or more wireless client devices to maintain a count of wireless client devices assigned to a respective classification among a plurality of classifications (bins), wherein each classification (bin) has a rotation timer or window. Counts of wireless client devices for each of the plurality of classifications (bins) are evaluated to determine the impact of MAC address rotation. Again, the rotation timer or window may be a specified time window or may be learned based on observations made from MAC address rotations of one or more clients over a period of time.

There may be certain wireless clients that are not able to support centralized rotation instructions. Such wireless clients may only be able to rotate MACs on their own without external prompting. This will largely depend on driver support in the client.

For wireless clients that support MAC rotation management, at step 340, the Scheduling Coordinator 52 communicates via the APs and configures the wireless client devices to modify the MAC rotation schedule on a per-wireless client basis (e.g. pushing some wireless clients to rotate before the deadline, before roaming, etc.). Client vendors may decide that, as the client requests services from the wireless infrastructure, the client should comply with the infrastructure policy, and thus enable MAC address rotation management. Other vendors may decide that the client should not trust any entity, and should manage its MAC rotation independently, without regard for what the network wants or asks. It is, therefore, expected that both MAC rotation managed clients, and MAC rotation non-managed clients, to coexist in the network.

For wireless clients that do not support MAC rotation management, the Scheduling Coordinator 52 attempts to influence the MAC rotation scheme based on the known MAC rotation behavior type of the respective wireless clients. For example, the Scheduling Coordinator 52 instructs the DHCP server 42 to send selectively and progressively shorter or longer leases to new wireless clients (that rely on DHCP times) to spread the MAC rotation over a longer, smoother time period. In another example, the Scheduling Coordinator 52 instructs APs to push wireless clients at the edge of a coverage area of an AP (cell) to other APs, such as by using the mechanism of IEEE 802.11v Basic Service Set Transition Management (BTM). In still another example, the Scheduling Coordinator 52 may selectively send de-authentication messages to idle wireless clients, thus forcing the wireless client to rejoin, using a new MAC address in the process. In yet another, the Scheduling Coordinator 52 instructs APs/WLCs to slow down the forwarding of DHCP requests/Duplicate Address Detection (DAD) messages, thus causing the wireless clients to delay their address renewal and thereby limiting the size of the renewal flow on the infrastructure. For this type of behavior, the Scheduling Coordinator 52 instructs the network entities/processes to put protection mechanisms in place (throttling DHCP and other requests) to prevent the flood of infrastructure updates. Even in the case of a wireless client that supports MAC rotation, the wireless client can decide to ignore the instructions from the Scheduling Coordinator 52.

Through these techniques, the Scheduling Coordinator 52 maintains a real-time inventory of the stress levels of network devices and processes, and ensures they are below a target threshold. The Scheduling Coordinator 52 does this by orchestrating the MAC address rotations in ways that allow for a natural, smoother rotation to happen without causing noticeable resource impact on the network devices and processes. There is no cooperative mechanism heretofore known in which the infrastructure instruct/influence a wireless client to anticipate or delay an action in order to limit the strain on the network resources. The methods presented herein limit the resource strains on the infrastructure by organizing the MAC address rotations of wireless clients into subgroups, based on the ability to learn MAC address rotation patterns (based on the client behavior, as well as the particular building structure where the wireless clients are operating, i.e. convention center movements differ from movements in education space). The Scheduling Coordinator may learn which wireless clients implement an IEEE 802.11bi infrastructure-based MAC address rotation trigger scheme, organize these clients in coherent subgroups and apply to act on this sub-group preemptively for structured MAC address rotation queries.

Figure 6:
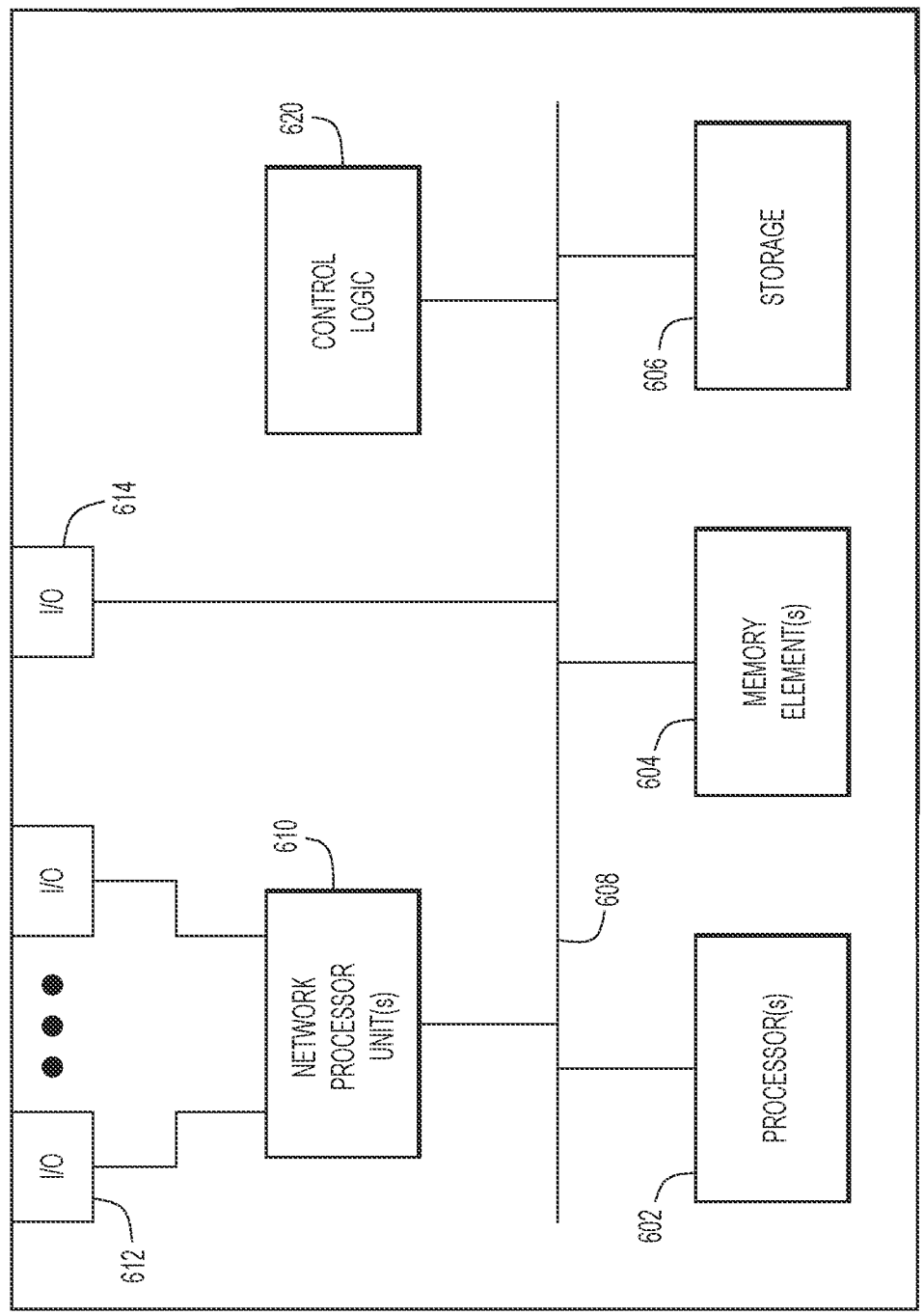
FIG. 6 is a block diagram of a network management device that may be configured to perform the methods presented herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any entity/entities as discussed for the techniques depicted in connection with FIGS. 1-5, such as the WLC 50 executing the Scheduling Coordinator 52, in order to perform operations of the various techniques discussed herein.

In at least one embodiment, the computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method performed for a wireless network that includes one or more wireless client devices that may rotate their media access control (MAC) address used for wireless communication with one or more wireless access point devices in the wireless network, the method including: determining an impact of MAC address rotation by the one or more wireless client devices on operational resources of one or more networking devices or networking processes in a network infrastructure associated with the wireless network; and scheduling MAC address rotation by the one or more wireless client devices according to the impact on operational resources of the one or more networking devices or networking processes in the network infrastructure.

In some aspects, the scheduling is performed so as to minimize the impact on operational resources of the one or more networking devices or networking processes in the network infrastructure.

In some aspects, the determining the impact includes computing a cost for each of the one or more networking devices or networking processes as a result of a MAC address rotation by one of the one or more wireless client devices.

In some aspects, the computing the cost includes computing an aggregate MAC address rotation cost across the one or more wireless client devices.

In some aspects, the determining includes: assigning each of the one or more wireless client devices to a classification based on a MAC address rotation behavior type of the one or more wireless client devices to maintain a count of wireless client devices assigned to a respective classification among a plurality of classifications, wherein each classification has a rotation timer or window; and evaluating counts of wireless client devices for each of the plurality of classifications.

In some aspects, the rotation timer or window is a specified time interval or is learned based on observations made from MAC address rotations of the one or more wireless client devices over a period of time.

In some aspects, the scheduling includes: sending an instruction, via the one or more wireless access point devices, to the one or more wireless client devices to modify a MAC address rotation schedule of the one or more wireless client devices.

In some aspects, the scheduling includes: sending an instruction to the one or more networking devices or networking processes and/or the one or more wireless access point devices to change a configuration or networking operation that in turn causes a change in a timing of MAC address rotation of the one or more wireless client devices.

In some aspects, the scheduling includes adjusting a timing of MAC address rotations performed by a plurality of wireless client devices to smooth out processing burden on the one or more networking devices or networking processes.

In some aspects, the adjusting includes limiting a number of MAC address rotations by the plurality of wireless client devices within a predetermined period of time.

In some aspects, the techniques described herein relate to an apparatus including: one or more network interfaces that enable network communication including communication with one or more wireless access point devices that serve one or more wireless client devices in a wireless network; and at least one processor coupled to the one or more network interfaces, the at least one processor configured to perform operations including: determining an impact of MAC address rotation by the one or more wireless client devices on operational resources of one or more networking devices or networking processes in a network infrastructure associated with the wireless network; and scheduling MAC address rotation by the one or more wireless client devices according to the impact on operational resources of the one or more networking devices or networking processes in the network infrastructure.

In some aspects, the at least one processor is configured to perform the determining the impact by computing a cost for each of the one or more networking devices or networking processes as a result of a MAC address rotation by one of the one or more wireless client devices, and to perform the scheduling so as to minimize the impact on operational resources of the one or more networking devices or networking processes in the network infrastructure.

In some aspects, the at least one processor is configured to perform the determining by: assigning each of the one or more wireless client devices to a classification based on a MAC address rotation behavior type of the one or more wireless client devices to maintain a count of wireless client devices assigned to a respective classification among a plurality of classifications, wherein each classification has a rotation timer or window; and evaluating counts of wireless client devices for each of the plurality of classifications.

In some aspects, the at least one processor is configured to perform the scheduling by: sending an instruction, via the one or more wireless access point devices, to the one or more wireless client devices to modify a MAC address rotation schedule of the one or more wireless client devices; or sending an instruction to the one or more networking devices or networking processes and/or the one or more wireless access point devices to change a configuration or networking operation that in turn causes a change in a timing of MAC address rotation of the one or more wireless client devices.

In some aspects, the at least one processor is configured to perform the scheduling by adjusting a timing of MAC address rotations performed by a plurality of wireless client devices to smooth out processing burden on the one or more networking devices or networking processes.

In some aspects, the techniques described herein relate to one or more non-transitory computer readable media encoded with instructions that, when executed by a processor of a computing device that is in communication with one or more wireless access point devices that serve one or more wireless client devices in a wireless network, are operable to cause the computing device to perform operations including: determining an impact of MAC address rotation by the one or more wireless client devices on operational resources of one or more networking devices or networking processes in a network infrastructure associated with the wireless network; and scheduling MAC address rotation by the one or more wireless client devices according to the impact on operational resources of the one or more networking devices or networking processes in the network infrastructure.

In some aspects, the instructions for determining the impact include instructions for computing a cost for each of the one or more networking devices or networking processes as a result of a MAC address rotation by one of the one or more wireless client devices, and the instructions for scheduling include instructions for scheduling so as to minimize the impact on operational resources of the one or more networking devices or networking processes in the network infrastructure.

In some aspects, the instructions for scheduling include instructions for: sending an instruction, via the one or more wireless access point devices, to the one or more wireless client devices to modify a MAC address rotation schedule of the one or more wireless client devices; or sending an instruction to the one or more networking devices or networking processes and/or the one or more wireless access point devices to change a configuration or networking operation that in turn causes a change in a timing of MAC address rotation of the one or more wireless client devices.

In some aspects, the instructions for performing the determining include instructions for: assigning each of the one or more wireless client devices to a classification based on a MAC address rotation behavior type of the one or more wireless client devices to maintain a count of wireless client devices assigned to a respective classification among a plurality of classifications, wherein each classification has a rotation timer or window; and evaluating counts of wireless client devices for each of the plurality of classifications.

In some aspects, the instructions for performing the scheduling include instructions for adjusting a timing of MAC address rotations performed by a plurality of wireless client devices to smooth out processing burden on the one or more networking devices or networking processes.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed for a wireless network that includes a plurality of wireless client devices configured to rotate a media access control (MAC) address used for wireless communication with one or more wireless access point devices in the wireless network, the method comprising:
    determining an impact of MAC address rotations by the plurality of wireless client devices on operational resources of one or more networking devices or networking processes in a network infrastructure associated with the wireless network,
    wherein determining the impact comprises observing the MAC address rotations of the plurality of wireless client devices over time to learn MAC address rotation patterns of the plurality of wireless client devices and computing an aggregate MAC address rotation cost for each of the one or more networking devices or the networking processes across the plurality of wireless client devices as a result of the MAC address rotations by the plurality of wireless client devices; and
    scheduling batches of wireless client devices in a group of wireless client devices to perform the MAC address rotations at a different time than when all wireless client devices in the group are expected to perform the MAC address rotations according to the impact on operational resources of the one or more networking devices or the networking processes in the network infrastructure.

2. The method of claim 1, wherein scheduling is performed so as to minimize the impact on operational resources of the one or more networking devices or the networking processes in the network infrastructure.

3. The method of claim 1, wherein scheduling comprises setting a rotation timer or window for the MAC address rotations of the wireless client devices in the group.

4. The method of claim 1, wherein scheduling includes initiating a partial de-coordination of the MAC address rotations of the wireless client devices in the group to limit the impact.

5. The method of claim 1, wherein scheduling includes:
    sending an instruction, via the one or more wireless access point devices, to the wireless client devices in the group to modify a MAC address rotation schedule of the wireless client devices in the group.

6. The method of claim 1, wherein scheduling includes:
    sending an instruction to the one or more networking devices or the networking processes and/or the one or more wireless access point devices to change a configuration or networking operation that causes a change in a timing of the MAC address rotations of the wireless client devices in the group.

7. The method of claim 1, wherein scheduling includes adjusting a timing of the MAC address rotations performed by the wireless client devices in the group to smooth out processing burden on the one or more networking devices or the networking processes.

8. The method of claim 7, wherein adjusting comprises limiting a number of the MAC address rotations by the wireless client devices in the group within a predetermined period of time.

9. The method of claim 1, wherein the MAC address rotation patterns are learned based on a particular use of a building where the plurality of wireless client devices are operating, the particular use having one or more associated movement patterns of the plurality of wireless client devices within the building or between buildings and associated MAC address rotation behavior of the plurality of wireless client devices.

10. An apparatus comprising:
    one or more network interfaces that enable network communication including communication with one or more wireless access point devices that serve a plurality of wireless client devices in a wireless network; and
    at least one processor coupled to the one or more network interfaces, the at least one processor configured to perform operations including:
    determining an impact of MAC address rotations by the plurality of wireless client devices on operational resources of one or more networking devices or networking processes in a network infrastructure associated with the wireless network,
    wherein determining the impact comprises observing the MAC address rotations of the plurality of wireless client devices over time to learn MAC address rotation patterns of the plurality of wireless client devices and computing an aggregate MAC address rotation cost for each of the one or more networking devices or the networking processes across the plurality of wireless client devices as a result of the MAC address rotations by the plurality of wireless client devices; and scheduling batches of wireless client devices in a group of wireless client devices to perform the MAC address rotations at a different time than when all wireless client devices in the group are expected to perform the MAC address rotations according to the impact on operational resources of the one or more networking devices or the networking processes in the network infrastructure.

11. The apparatus of claim 10, wherein the at least one processor is configured to perform the scheduling so as to minimize the impact on operational resources of the one or more networking devices or the networking processes in the network infrastructure.

12. The apparatus of claim 10, wherein the at least one processor is configured to perform the scheduling by:
setting a rotation timer or window for the MAC address rotations of the wireless client devices in the group.

13. The apparatus of claim 10, wherein the at least one processor is configured to perform the scheduling by:
initiating a partial de-coordination of the MAC address rotations of the wireless client devices in the group to limit the impact.

14. The apparatus of claim 10, wherein the at least one processor is configured to perform the scheduling by:
sending an instruction, via the one or more wireless access point devices, to the wireless client devices in the group to modify a MAC address rotation schedule of the wireless client devices in the group; or
sending an instruction to the one or more networking devices or the networking processes and/or the one or more wireless access point devices to change a configuration or networking operation that causes a change in a timing of MAC address rotations of the wireless client devices in the group.

15. One or more non-transitory computer readable media encoded with instructions that, when executed by a processor of a computing device that is in communication with one or more wireless access point devices that serve a plurality of wireless client devices in a wireless network, are operable to cause the computing device to perform operations including:
determining an impact of MAC address rotations by the plurality of wireless client devices on operational resources of one or more networking devices or networking processes in a network infrastructure associated with the wireless network,
wherein determining the impact comprises observing the MAC address rotations of the plurality of wireless client devices over time to learn MAC address rotation patterns of the plurality of wireless client devices and computing an aggregate MAC address rotation cost for each of the one or more networking devices or the networking processes across the plurality of wireless client devices as a result of the MAC address rotations by the plurality of wireless client devices; and scheduling batches of wireless client devices in a group of wireless client devices to perform the MAC address rotations at a different time than when all wireless client devices in the group are expected to perform the MAC address rotations according to the impact on operational resources of the one or more networking devices or the networking processes in the network infrastructure.

16. The one or more non-transitory computer readable media of claim 15, wherein the instructions for scheduling comprise instructions for scheduling so as to minimize the impact on operational resources of the one or more networking devices or the networking processes in the network infrastructure.

17. The one or more non-transitory computer readable media of claim 15, wherein the instructions for scheduling include instructions for:
setting a rotation timer or window for the MAC address rotations of the wireless client devices in the group.

18. The one or more non-transitory computer readable media of claim 15, wherein the instructions for performing the scheduling comprise instructions for:
initiating a partial de-coordination of the MAC address rotations of the wireless client devices in the group to limit the impact.

19. The one or more transitory computer readable media of claim 15, wherein scheduling includes:
sending an instruction, via the one or more wireless access point devices, to the wireless client devices in the group to modify a MAC address rotation schedule of the wireless client devices in the group.

20. The one or more transitory computer readable media of claim 15, wherein scheduling includes:
sending an instruction to the one or more networking devices or the networking processes and/or the one or more wireless access point devices to change a configuration or networking operation that causes a change in a timing of the MAC address rotations of the wireless client devices in the group.

* * * * *